(12) United States Patent
Sasagawa et al.

(10) Patent No.: US 6,340,515 B1
(45) Date of Patent: Jan. 22, 2002

(54) CONDUCTIVE MEMBER

(75) Inventors: Gouki Sasagawa, Kanagawa; Tetsuya Nakamura; Masato Ogasawara, both of Tokyo, all of (JP)

(73) Assignees: Hokushin Corporation, Kanagawa; Toshiba Tec Kabushiki Kaisha, Tokyo; Kabushiki Kaisha Toshiba, Kanagawa, all of (JP)

( * ) Notice: Subject to any disclaimer, the term of this patent is extended or adjusted under 35 U.S.C. 154(b) by 0 days.

(21) Appl. No.: 09/388,368

(22) Filed: Sep. 1, 1999

(51) Int. Cl.[7] ............................................. B32B 23/02
(52) U.S. Cl. .......................... 428/192; 428/218; 428/323
(58) Field of Search .................................. 428/192, 212, 428/213, 218, 220, 323, 325, 332, 339, 423.1, 447, 688

(56) References Cited

U.S. PATENT DOCUMENTS 5,477,006 A * 12/1995 Imamiya et al. ............ 118/651
5,682,582 A * 10/1997 Ogasawara et al. ......... 399/174
5,749,030 A    5/1998 Park ............................ 399/148
6,004,669 A * 12/1999 Rokutan et al. ............. 428/335

FOREIGN PATENT DOCUMENTS

| GB | 2 236 215 | * | 3/1991 |
| JP | 08 286 470 | * | 3/1991 |

* cited by examiner

Primary Examiner—Bruce H. Hess
Assistant Examiner—B. Shewareged
(74) Attorney, Agent, or Firm—Sughrue, Mion, Zinn, Macpeak & Seas, PLLC

(57) ABSTRACT

A conductive member is used in a state in which the conductive member maintains contact with a subject member. The conductive member has a single-body structure and is formed of a polymeric base material that contains a conducting filler. A portion of the conductive member in which the density of the conducting filler is lower than that in the remaining portion or substantially zero ranges 20–120 μm inwardly from an end of the conductive member at which the conductive member abuts the subject member.

11 Claims, 5 Drawing Sheets

[1] BEFORE PASSING FLOATING CONDUCTIVE MEMBER

POTENTIAL V OF PHOTOSENSITIVE MEMBER

[2] AFTER PASSING CONDUCTIVE MEMBER

FOGGING, HALFTONE NG
POSITIVE
NEGATIVE

[1] BEFORE PASSING GROUNDED CONDUCTIVE MEMBER

[2] AFTER PASSING CONDUCTIVE MEMBER

[1] BEFORE PASSING VOLTAGE-APPLIED CONDUCTIVE MEMBER

[2] AFTER PASSING CONDUCTIVE MEMBER

CONDUCTIVE MEMBER

BACKGROUND OF THE INVENTION

1. Field of the Invention

The present invention relates to a conductive member, and more particularly to a conductive member for use in electrostatographic processes for smoothing charges on, eliminating charges from, or establishing charges on an electrophotosensitive member, a transfer drum or transfer belt used in a transfer process, an intermediate transport belt, and a developing blade used in a developing process among others.

2. Description of the Related Art

Among chargers, there have been known corona chargers utilizing corona discharge and contact chargers. In a corona charger, since a high voltage of 4–8 kV must be applied to a wire, the wire and the case that surrounds the wire must be isolated from each other in order to prevent current leakage from the wire to the case. Thus, the corona charger has a drawback in that its size becomes larger. Also, since most discharge current flows to the case, a large magnitude of discharge is required in order to supply a required amount of current to an electrophotosensitive member. As a result, a large amount of ozone is generated, causing oxidation of apparatus components and deterioration of the surface of the electrophotosensitive member. Also, such ozone may be harmful to the human body.

In view of such drawbacks of corona chargers, contact chargers have been replacing corona chargers.

In contrast to the corona charger, the contact charger can charge, for example, an electrophotosensitive member at low voltage, thereby enabling implementation of a compact electrostatographic apparatus. The amount of generated ozone is $\frac{1}{10}$ to $\frac{1}{100}$ that in the case of the corona charger. The contact charger is implemented as a conductive brush, a single-layer roller, a multilayer roller, or a blade, among other forms.

In the case of a brush-type charger employing a conductive brush of, for example, rayon fibers that contain carbon, combings are unavoidable, causing current leakage to other chargers. Also, bristles of the brush fan out with use, potentially causing current leakage to a peripheral element. Charging tends to become nonuniform, causing minute ruggedness in electric potential on the surface of an electrophotosensitive member and resulting in formation of white or black lines on an image.

A single-layer conductive member, such as a roller, involves a problem in that applied voltage leaks to any scratch present on an electrophotosensitive member. Since the resistance of the conductive member depends sensitively on the amount of a conducting filler added to a base material, resistance control is difficult.

In the case of a multilayer conductive member, such as a roller covered with a tube, the structure is complex with a resultant increase in cost.

In the case of a conductive member such as a blade including a conductive base material and an insulating layer applied or bonded to the base material, when the insulating layer wears, the conductive base material may be exposed or may exfoliate. In the case of a blade including an insulative base material and a conductive layer applied to the insulative base material, the conductive layer may exfoliate. Also, cost increases as compared to the case of a single-body structure.

SUMMARY OF THE INVENTION

In view of the foregoing, an object of the present invention is to provide a conductive member for use in a contact charger capable of properly charging a subject member and that exhibits good durability and is easy to fabricate at low cost.

To achieve the above object, the present invention provides a conductive member which is used in a state in which the conductive member maintains contact with a subject member. The conductive member has a single-body structure and is formed of a polymeric base material that contains a conducting filler. The density of the conducting filler as measured at or in the vicinity of a portion of the conductive member that abuts the subject member is lower than that in the remaining portion of the conductive member, or substantially zero.

Preferably, the portion in which the density of the conducting filler is lower than that in the remaining portion or substantially zero ranges 20–120 μm inwardly from an end of the conductive member at which the conductive member abuts the subject member.

Preferably, the true density of particles of the conducting filler or the specific gravity of particles including the conducting filler is greater than the specific gravity of the polymeric base material.

Preferably, the polymeric base material, which contains the conducting filler, is manufactured through centrifugal molding.

Preferably, the conductive member contains as the conducting filler at least carbon black.

Preferably, the conductive member contains as the conducting filler carbon black as a main filler, and one or more fillers selected from the group consisting of ionic conducting fillers and carbon black dispersants.

Preferably, the conductive member contains as the conducting filler carbon black in an amount of 0.1–5.0% by weight in relation to the amount of the polymeric base material. More preferably, the conductive member contains as the conducting filler one or more fillers selected from the group consisting of ionic conducting fillers and carbon black dispersants in an amount of 0.01–5.0% by weight in relation to the amount of the polymeric base material.

Preferably, the electric resistance of the conducting member is $1 \times 10^5$ to $1 \times 10^9$ Ω·cm.

Preferably, the polymeric base material is an elastomer.

Preferably, the polymeric base material is polyurethane or silicone rubber.

Preferably, the conductive member assumes a blade shape.

The conductive member according to the present invention has a single-body structure, and the portion that contains the conducting filler at relatively low density or contains no conducting filler ranges 20–120 μm inwardly from an end of the conductive member at which the conductive member abuts a subject member (a member to be charged such as an electrophotosensitive member). Therefore, there can be prevented voltage leakage to any scratch present on the subject member, and coming off of the conducting filler from the portion of the conducting member that abuts the subject member. Also, by controlling the thickness of the low-distribution-density portion, the electric resistance of the conducting member can be controlled easily. Through employment of the single-body structure, the fabrication process becomes simple, and fabrication costs reduce. Also, exfoliation of a component element is not involved. Through employment of the polymeric base material; particularly, liquid polyurethane, the conductive member can be fabricated through centrifugal molding. Also, ooze of a plasticizer is not involved.

Through contact with the subject member, such as an electrophotosensitive member, the conductive member of the present invention can smooth out charges on, eliminate charges from, or establish charges on the subject member. Also, a function other than an electrical one can be imparted to the conductive member.

DESCRIPTION OF THE INVENTION AND PREFERRED EMBODIMENTS

Figure 1A:
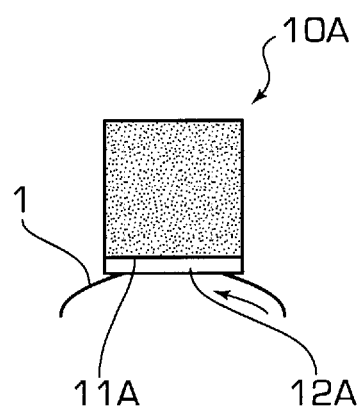
FIG. 1A is a view showing the shape of a conductive member of the present invention.

The present invention will now be described in detail. In the case of a conductive member that abuts a member to be charged (hereinafter referred to as a "subject member"), such as an electrophotosensitive member, employment of an insulating layer formed on a portion of the conductive member that abuts the subject member is known to prevent voltage leakage to a scratch on the subject member, which would otherwise occur when voltage is applied to the conductive member. According to the present invention, the conductive member assumes a single-body structure and is formed of a polymeric base material. A portion of the conductive member that abuts the subject member contains a conducting filler of lower density than that of the remaining portion of the conductive member, or contains substantially no conducting filler.

The present invention is achieved on the basis of a finding that the electric resistance of the conductive member depends on the thickness of a portion of the conductive member in which the density of the conducting filler is low or substantially zero (hereinafter referred to as a "portion of low conducting-filler density"), and does not depend on the electric resistance of a portion in which the density of the conducting filler is high. In other words, the electric resistance of the conductive member can be controlled by means of the thickness of the portion of low conducting-filler density. Thus, the conductive member having a desired electric resistance can be fabricated easily. When the portion of low conducting-filler density is sufficiently high in electric resistance (for example, volume resistance is at least three orders of magnitude greater) in relation to the portion of high conducting-filler density, the electric resistance of the conductive member depends on that of the portion of low conducting-filler density. Accordingly, the electric resistance of the conductive member according to the invention is hardly influenced by the electric resistance of the portion of high conducting-filler density. Therefore, there is no need for strictly controlling the amount of the conducting filler to be added, and the electric resistance of the conductive member can be controlled easily. Notably, the electric resistance of a conventional conductive member is highly sensitive to the amount of conducting filler contained in the base material, and is thus difficult to control.

Among conventional conductive members, there is one that includes a conductive base material and an insulating layer attached to the base material. Examples of such a conductive member include a roller covered with a tubular insulating layer and a blade to which an insulating layer is applied or bonded. However, these conductive members are of complex structure, thereby boosting costs. Also, when the insulating layer wears, the insulating layer may exfoliate. A similar drawback is also involved in the case of a conductive member that includes an insulative base material coated or sheathed with a conductive layer applied or bonded to the base material.

In the conductive member of the present invention, a portion of low conducting-filler density abuts a subject member, such as an electrophotosensitive member, thereby utilizing the intrinsic endurance to wear possessed by an insulative base material. This feature prevents-damage to a subject member, which would otherwise be caused by conducting filler particles that come off the conductive member due to wear thereof. Further, employment of a single-body structure reduces costs and avoids exfoliation of a component member.

The conductive member of the present invention may assume a block shape, roller shape, or blade shape. The conductive member in a blade shape may abut a subject member in either "trail contact" (i.e., such that the end of the blade faces in the same direction as that in which the subject member rotates) or "against contact" (i.e., such that the end of the blade faces in the direction opposite that in which the subject member rotates).

FIGS. 1A to 1D exemplify conductive members of various shapes. A conductive member 10A shown in FIG. 1A has a single-body structure in a block shape and includes a conductive portion 11A and a nonconductive portion 12A. The conductive portion 11A accounts for most of the conductive member 10A. The nonconductive portion 12A is located at one end of the conductive member 10A and contains a conducting filler at a density lower than that in the conductive portion 11A. The nonconductive portion 12A abuts an electrophotosensitive member 1, which serves as a subject member.

Figure 1B:
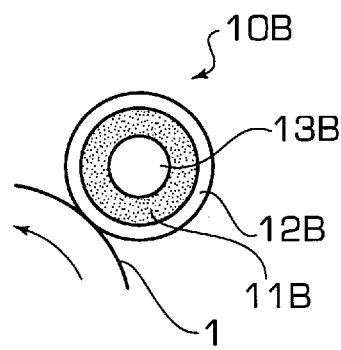
FIG. 1B is a view showing another shape of the conductive member.

A conductive member 10B shown in FIG. 1B has a single body structure in a roller shape and includes a conductive portion 11B, a nonconductive portion 12B formed on the conductive portion 11B, and a core 13B on which the conductive portion 11B is disposed.

Figure 1C:
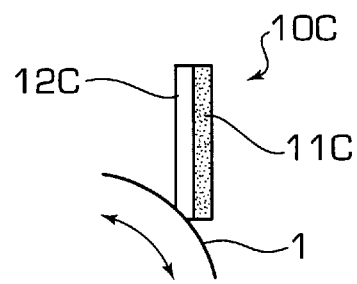
FIG. 1C is a view showing still another shape of the conductive member.

A conductive member 10C shown in FIG. 1C has a blade shape and includes a conductive portion 11C and a nonconductive portion 12C, which is provided on one end surface of the conductive portion 11C as viewed in the thickness direction of the conductive portion 11C. The conductive member 10C may abut the electrophotosensitive member 1 in either "trail contact"—in which the electrophotosensitive member 1 rotates clockwise—or "against contact"—in which the electrophotosensitive member 1 rotates counterclockwise—so long as the nonconductive portion 12C abuts the eleotrophotosensitive member 1.

Figure 1D:
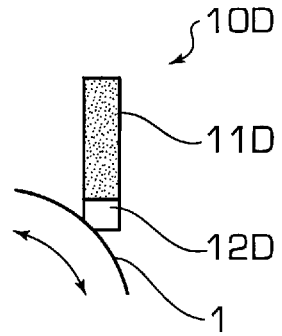
FIG. 1D is a view showing a further shape of the conductive member.

A conductive member 10D shown in FIG. 1D has a blade shape and includes a conductive portion 11D and a nonconductive portion 12D, which is provided on one end surface of the conductive portion 11D as viewed in the longitudinal direction of the conductive portion 1D. The conductive member 10D is used in a manner similar to that in the case of the conductive member 10C.

Preferably, as will be described later, the conductive member is formed of an elastic or flexible material. The thickness of a portion of low conducting-filler density is preferably 20–120 μm. In the conductive member having the blade shape, a portion of high conducting-filler density accounts for a smaller portion of the conductive member than in the case of conductive members of other shapes. Accordingly, the content of a conducting filler in relation to that of a base material can be reduced, so that the "excess conducting filler", problem, which will be described later, becomes unlikely to occur. Therefore, the blade shape is preferred.

The conducting filler used in the present invention is not particularly limited so long as it has electrical conductivity and is insoluble in a polymeric base material, such as rubber. Examples of such a conducting filler include carbon black and metal powder. Particularly, carbon black is relatively inexpensive and enables easy formation of a three-dimensional structure. Moreover, carbon black can develop electrical conductivity through addition in a smaller amount than can metal powder. Also, the electrical conductivity of carbon black is less sensitive to temperature and humidity. The kind of carbon black is not particularly limited. Specific examples of carbon black include KETJEN BLACK (trade name, product of Lion Corp.) and TOKA BLACK #5500 (trade name, product of Tokai Carbon Co., Ltd.).

Since carbon black or metal powder, when used as a conducting filler, develops electrical conductivity through direct contact among filler particles, it must be contained in a relatively large amount, thus potentially causing deterioration in physical properties of a rubber member. By contrast, an ionic conducting filler can develop electrical conductivity through addition in a small amount and does not cause deterioration in physical properties of a base material when added to the base material. Accordingly, when carbon black or metal powder used singly fails to develop sufficient electrical conductivity, an ionic conducting filler may be added as an auxiliary filler. The ionic conducting filler is not particularly limited. Examples of such an ionic conducting filler include lithium perchlorate. A carbon black dispersant may be used as well. Examples of such a carbon black dispersant include DISPARLON DA-703-50 (trade name, product of Kusumoto Kasei Co., Ltd.). Ionic conducting fillers and carbon black dispersants may be used singly or in combination.

When carbon black is used in combination with an ionic conducting filler or carbon black dispersant, electrical conductivity can be developed in a smaller amount of addition than in the case where carbon black is used singly. As a result, the physical properties of a base material are not deteriorated, and a feature of carbon black that electrical conductivity is less sensitive to temperature and humidity can be imparted to the conductive member.

That is, in order to develop electrical conductivity, carbon black may be used singly or in combination with an ionic conducting filler or carbon black dispersant.

The conducting filler used in the present invention may be added to a polymeric base material directly or in such a form that the conducting filler is carried by or affixed to other particles. Preferably, the true density of conducting filler particles or the specific gravity of particles including a conducting filler is greater than the specific gravity of a polymeric base material. Through employment of this feature, the density of the conducting filler as measured at or in the vicinity of a portion of the conductive member that abuts a subject member becomes relatively low or substantially zero. Herein, the term "true density" denotes a density based on a solid volume in which no voids are present, in contrast to bulk density based on a bulk volume of particles, such as in the case of carbon black. Particles include those in the form of powder, short fibers, or flakes. Examples of particles that carry a conducting filler or to which a conducting filler is affixed include glass particles and highly dense resin particles.

The polymeric base material of the conductive member may be a rigid material, so long as it is insulative or semiconductive. However, in order to establish reliable contact with a subject member, such as an electrophotosensitive member, the polymeric base material is preferably an elastic or flexible material. Examples of such an elastic material include elastomers, polyurethane, and silicone rubber and other rubber materials. Examples of such a flexible material include polyamide (PA), polyethylene terephthalate (PET), polyimide (PI), polyester, and other organic materials.

The polymeric base material must enable smooth dispersion of a conducting material. From this point of view, a liquid thermosetting elastomer, liquid polyurethane, or liquid silicone rubber is preferred as a polymeric base material.

Many rubber materials contain a plasticizer. Accordingly, when such a rubber material is left in contact with a subject member, the subject member may be contaminated with the plasticizer. In the case where the subject member is an electrophotosensitive member, polyurethane or silicone rubber is preferred as a polymeric base material. Notably, silicone rubber involves a drawback in that an oligomer may ooze out gradually. From this point of view, polyurethane is most preferred.

Among polyurethane materials, injection-modable liquid polyurethane is particularly preferred. Such polyurethane can be obtained through thermally curing a mixture of high-molecular-weight polyol, an isocyanate compound, a chain extender, and a crosslinker, among others. Examples of polyol include polyester polyol, polycarbonate polyol, polyether polyol, and polycarbonate ether polyol. Examples of an isocyanate compound include 4,4'-diphenyl methane diisocyanate (MDI), 2,6-toluene diisocyanate (TDI), 1,5-naphthalene diisocyanate (NDI), 3,3-dimethyldiphenyl-4-diisocyanate (TODI), and p-phenylene diisocyanate (PPDI). Examples of a chain extender include butanediol, ethylene glycol, trimethylolpropane, and polyvalent alcohol such as glycerin. Examples of a crosslinker include aromatic diamine crosslinkers.

No particular limitation is placed on a method for manufacturing a conductive member in which the density of a conducting filler as measured at or in the vicinity of a portion that abuts a subject member, such as an electrophotosensitive member, is lower than that in the remaining portion, or substantially zero. However, centrifugal molding is preferred when the true density of a conducting filler is rendered greater than the specific gravity of a base material, the conducting filler sediments even in static molding. This holds true in the case where a conducting filler is carried by or affixed to other particles if the specific gravity of the particles is greater than that of the base material. However, when the base material has high viscosity, the conducting filler has large specific surface area, or when the setting speed of the base material is higher than the sedimentation velocity of the conducting filler, sedimentation of the conducting filler does not progress. Thus, there cannot be obtained a portion of the conductive member where the conducting filler is distributed at a sufficiently low density. In such a case, centrifugal molding is preferred.

According to centrifugal molding, a molding material is charged into a rotary drum of a centrifugal molding machine. Then, the drum is rotated at a predetermined speed for molding. Thus, sedimentation of the conducting filler is accelerated. Notably, a substrate layer for forming a mold face may be formed within the drum before a molding material is charged into the drum.

Figure 2:
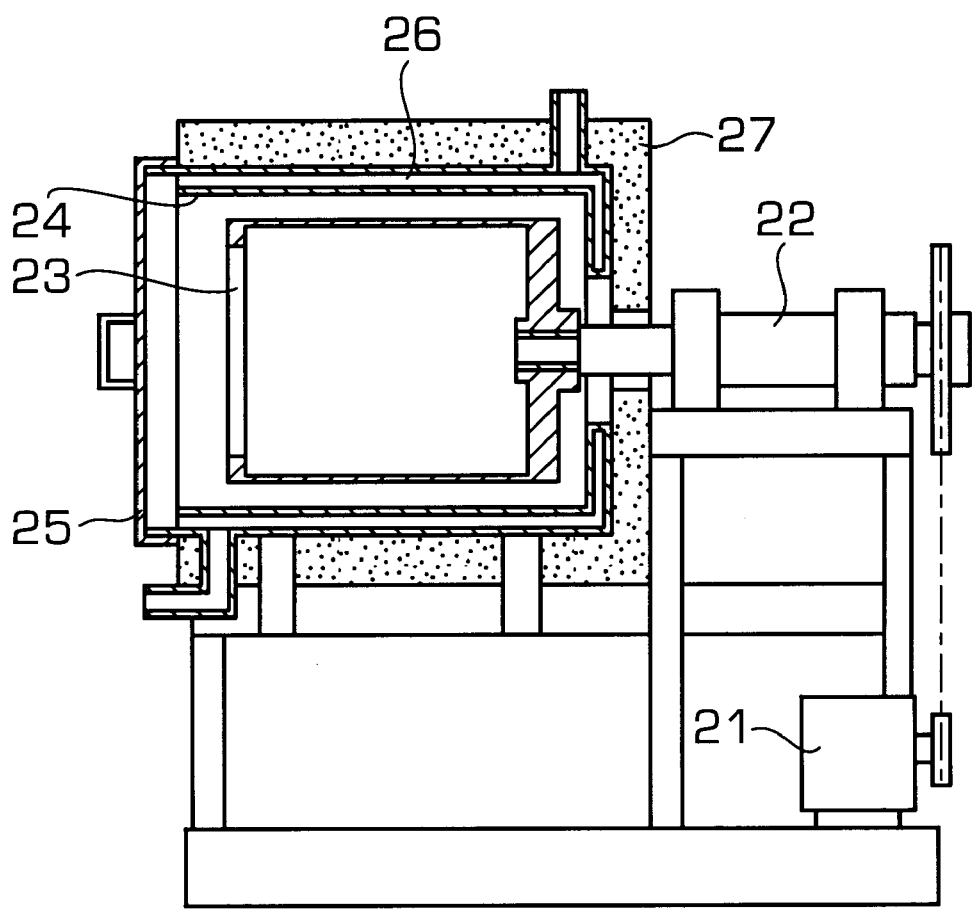
FIG. 2 is a view showing an apparatus for fabricating the conductive member.

FIG. 2 shows an example of a centrifugal molding apparatus. As shown in FIG. 2, the centrifugal molding apparatus includes a motor 21, a shaft 22 that is rotated by the motor 21, and a drum mold 23. One end of the shaft 22 is fixedly connected to a central portion of a bottom of the drum mold 23. The drum mold 23 is held within a boxlike heating jacket 24. An opening of the heating jacket 24 is covered with a cover 25. A heating fluid passage 26, through which a heating fluid flows, surrounds the heating jacket 24. The heating fluid passage 26 is covered with a heat-insulating layer 27.

A mixture of a polymeric base material and carbon black serving as a conducting filler is charged into the drum mold 23. When the drum mold 23 is rotated, a centrifugal force is induced and promotes movement of the conducting filler, which has a high true density, toward the inner surface of the drum mold 23. Specifically, when the true density of the conducting filler is greater than the density of the base material, the conducting filler is distributed within a conductive member molded within the drum mold 23 such that conducting-filler density increases toward the mold surface. In other words, the density of the conducting filler becomes sufficiently low or substantially zero at the open surface side of the conductive member molded within the drum mold 23 (a surface of a conductive member that is exposed to the atmosphere when the conductive member rests within the drum mold is hereinafter referred to as an "open surface"). Accordingly, the thus-molded conductive member is used in a charger such that the open-surface side abuts a subject member, such as an electrophotosensitive member.

Pits and projections on the surface of the drum mold 23 are impressed on the surface of the conductive member that is in contact with the mold surface during molding. By contrast, the open surface is smooth and thus abuts a subject member reliably.

After the rotation of the drum mold 23 is stopped, the cylindrical molded conductive member is cut in the axial direction, yielding a conductive-member sheet. The sheet is aged as needed and is then cut such that the longitudinal direction of a final conductive member corresponds to the circumferential direction of the cylindrical molded conductive member, whereby the thickness of the final conductive member becomes uniform. The thickness of the conductive member can be controlled by means of controlling the amount of the molding material to be charged into the drum mold 23.

Alternatively, a molding material that contains a relatively large amount of a conducting filler is charged into the centrifugal molding machine to thereby form a first layer. While the first layer is semi-cured, a molding material that contains a relatively small amount of the conducting filler or contains no conducting filler is charged into the molding machine, thereby yielding a conductive member having a single-body structure and in which the density of the conducting filler is sufficiently low or substantially zero at one side. Alternatively, these two kinds of molding materials may be charged in layers into a press molding machine, thereby also yielding a conductive member having a single-body structure and in which the density of the conducting filler is sufficiently low or substantially zero at one side.

In the conductive member of the present invention, the thickness of a portion of low conducting-filler density can be controlled by controlling, for example, the viscosity and setting speed of a polymeric base material, the affinity and the difference in specific gravity between the polymeric base material and a conducting filler, the granular size and shape of the conducting filler, or the kind and amount of the conducting filler, and, in the case of centrifugal molding, by controlling a centrifugal force generated through rotation of a drum.

For example, carbon black (TOKA BLACK #5500) used as a conducting filler has a true density of approximately 1.8, and silicone rubber and polyurethane used as a polymeric base material have a specific gravity of approximately 0.9–1.2 and 1.0–1.3, respectively. Accordingly, polyurethane is preferred as the polymeric base material, enabling easy formation of a portion of low conducting-filler density in a conductive member. In the case where the specific gravity of a polymeric base material is greater than the true density of a conducting filler, the conducting filler may be affixed to glass particles having a specific gravity of 2.5.

In the conductive member of the present invention, preferably, a portion of low conducting-filler density ranges 20–120 $\mu$m inwardly from an end of the conductive member at which the conductive member abuts a subject member. This range was confirmed by, for example, the following test.

Polyester polyol serving as a polymeric base material was melted through application of heat. Into the melt, carbon black (TOKA BLACK #5500 (trade name, product of Tokai Carbon Co., Ltd.)) was dispersed, followed by dehydration under reduced pressure. 4,4'-Diphenyl methane diisocyanate (MDI) was reacted with the resulting mixture, yielding a prepolymer. 1,4-Butanediol and trimethylolpropane were mixed with the prepolymer. The resulting mixture was charged into a preheated centrifugal molding drum and was then cured through application of heat while the drum was being rotated. Subsequently, the resulting sheet was cut along the centrifugal direction, obtaining a blade-shaped conductive member having a thickness of 2.0 mm.

Various kinds of samples were prepared through centrifugal molding while the rotational speed of the drum; i.e., a centrifugal force was varied. Each sample was sliced thinly, followed by photographing of a portion of low conducting-filler density, by means of a metallographical microscope (a magnification of 200). Through observation of the photographs, a portion where the conducting filler occupies not greater than 30% of an observed area was defined as a portion of low conducting-filler density. The thickness as such a portion was measured with respect to the samples, obtaining a thickness of 10, 30, 60, 100, 120, and 150 $\mu$m. The volume resistivity of urethane sheets, of which the samples were made, was measured. Also, the blade-shaped conductive members were each mounted in a reverse-development-type printer in which an electrophotosensitive member is rotated at a circumferential velocity of 24 mm/s, and the charging capability thereof was measured. The results are shown in Table 1.

TABLE 1

| Thickness (μm) | Volume resistivity (Ω · cm) |
|---|---|
| 10 | $1.1 \times 10^6$ |
| 20 | $4.2 \times 10^6$ |
| 50 | $1.8 \times 10^7$ |
| 80 | $6.1 \times 10^7$ |
| 100 | $9.0 \times 10^7$ |
| 120 | $4.8 \times 10^8$ |
| 150 | $7.0 \times 10^8$ |

The volume resistivity was measured at a temperature of 23° C. and a humidity of 55%RH·30 seconds after application of voltage of 100 V. The charging capability was measured through application of a voltage of −1200 V. Since charging start voltage is −600 V, an electric potential of a little less than −600 V is built on the surface of the electrophotosensitive member when sufficient charging capability is available.

It was confirmed from the test that sufficient charging capability is exhibited when a portion of low conducting-filler density has a thickness of less than 100 μm. At a thickness of 100–120 μm, charging was observed through application of a voltage slightly higher than −1200 V. At a thickness of 150 μm, charging capability was insufficient even when a voltage of −2000 V was applied. Seemingly, therefore, a thickness of approximately 120 μm is an upper limit. Also, sufficient charging capability is developed at a volume resistivity of not greater than $1.0 \times 10^8$ Ω·cm, practically up to approximately $5.0 \times 10^8$ Ω·cm.

The above test results indicate that the thickness of a portion of low conducting-filler density is preferably not greater than 100 μm, practically up to 120 μm.

Next, a grounded conductive member was brought into contact with the electrophotosensitive member that had been charged previously to an electric potential of +600 V. In the case of the above-mentioned samples, it was confirmed that positive charges on the electrophotosensitive member move to the ground through a conductive member even when a portion of low conducting-filler density has a thickness of 150 μm. In other words, charges can be moved at a volume resistivity of up to approximately $1 \times 10^9$ Ω·cm even though sufficient charging capability is not developed.

The electrophotosensitive member was intentionally scratched and run. In the case of the sample in which a portion of low conducting-filler density has a thickness of 10 μm, voltage leakage was observed at the scratch on the electrophotosensitive member. Since conducting filler particles form an uneven profile at a boundary of a portion of low conducting-filler density, discharge is apt to occur at the boundary from the conducting filler toward the electrophotosensitive member. In the case of actual use over a long period of time, the conductive member wears because of friction with the electrophotosensitive member. Therefore, the lower limit of the thickness of the portion of low conducting-filler density is approximately 20 μm.

In the case of the samples in which the portion of low conducting-filler density has a thickness of less than 10 μm, there were observed some conducting filler particles existing in the vicinity of the surface of a conductive member. Such a conductive member is not applicable to a long-life apparatus, but is applicable to a short-life apparatus, such as a printer. However, in order to prevent voltage leakage to the electrophotosensitive member, a resistance of approximately 10 MΩ had to be installed between a power source and the conductive member. The resistance of the conductive member was somewhere between $1 \times 10^5$ and $5 \times 10^5$ (Ω·cm).

In the conductive member of the present invention, carbon black is preferred as a conducting filler. In order to confirm a preferred range of carbon black content, conducting-member samples were manufactured through centrifugal molding. Polyurethane was used as a polymeric base material, while the amount of carbon black added was varied. Manufacturing conditions were adjusted such that a portion of low conducting-filler density has a thickness of 40 μm.

A test using the above samples revealed that carbon black developed electrical conductivity singly when added in an amount of 0.1–5.0 wt % (percent by weight) in relation to the amount of a polymeric base material. In other, words, at this range of carbon black content, a volume resistivity of not greater than $5 \times 10^8$ Ω·cm was attained. Notably, this test employed TOA BLACK #5500 (trade name, product of Tokai Carbon Co., Ltd.) as carbon black. When carbon black is added in an amount of less than 0.1 wt %, sufficient electrical conductivity is not developed. When carbon black is added in an amount of not less than 5.0 wt %, the 100% elongation set of the resulting conductive-member material becomes greater than that of the polymeric base material. Thus, when a blade-shaped conductive member formed of this material is brought into contact with an electrophotosensitive member at a high pressure of 1.5 g/cm, the polymeric base material deforms; consequently, the abutting force decreases. Therefore, the conductive member fails to provide a long life. Also, when the carbon black content of a molding material was increased, the open surface of the conductive member formed through centrifugal molding failed to become smooth due to an increase in viscosity of the molding material. Further, excess carbon black potentially involves the following problems: carbon black existing in the vicinity of an open surface, if any, causes current leakage to a subject member; and carbon black comes off due to friction between the conductive member and the subject member.

At a carbon black content of 0.1–5.0 wt %, a conductive member does not involve aggregation of carbon black or viscosity increase. The permanent compression set characteristic of the conductive member is slightly deteriorated as compared to that of a polymeric base material, but is satisfactory. Also, electric resistance becomes satisfactorily uniform. The test revealed that a carbon black content of 0.5–2.5 wt % was most preferred.

Lithium perchlorate serving as an ionic conducting filler was used in combination with carbon black. Through combined use of an ionic conducting filler, even when the carbon black content of a conductive member is decreased, the conductive member has sufficient electric conductivity and exhibits satisfactorily uniform electric resistance. According to the test, by adding an ionic conducting filler in an amount of 0.5–5.0 wt % in relation to the amount of a polymeric base material, a volume resistivity of not greater than $5 \times 10^8$ Ω·cm was attained. At an ionic conducting filler content of less than 0.01 wt %, the effect of the ionic conducting filler is not sufficiently developed. At an ionic conducting filler content of not less than 5.0 wt %, the ionic conducting filler gradually oozes out from a conductive member and contaminates an electrophotosensitive member. According to the test, an ionic conducting filler content of 0.01–5.0 wt % did not involve ooze of an ionic conducting filler. The wear characteristics of a tested conductive member exhibited slight deterioration as compared to that of a polymeric base material. However, the observed degree of deterioration raises no problem in practical use. In terms of attainment of satisfactorily uniform electric resistance and satisfactory wear characteristics, an ionic conducting filler content of 0.05–1.0 wt % was most preferred.

Through combined use of carbon black serving as a conducting filler and an ionic conducting filler, the amount of carbon black to be added and the amount of an ionic conducting filler to be added can be both reduced. Further, since the lower limit of content of carbon black and the lower limit of content of ionic conducting filler are both lowered, occurrence of a problem caused by excess carbon black and/or ion-conductive filler is prevented.

The conductive member of the present invention abuts a subject member, such as an electrophotosensitive member, for smoothing charges on, eliminating charges from, or establishing charges on the subject member.

Figure 3A:
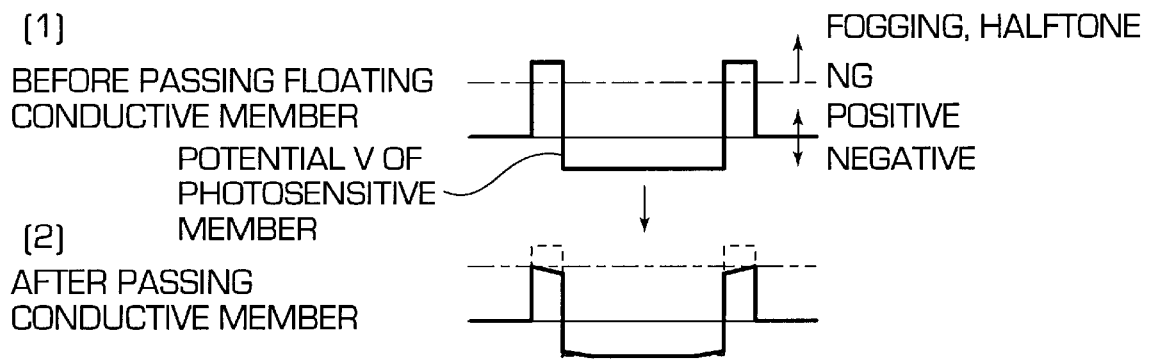
FIGS. 3A–3C are views for explaining a function of the conductive member.
Figure 3B:
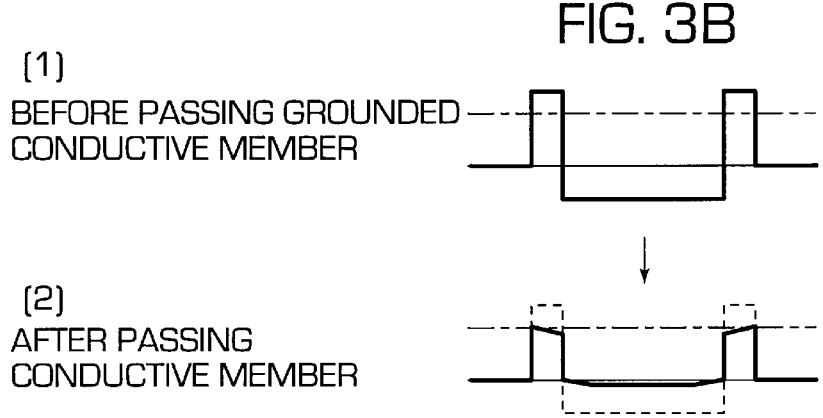

The above functions of the conductive member will next be described with reference to FIGS. 3A–3C, in which an electrophotosensitive member is the subject member. When the conductive member in an electrically floating state is brought into contact with the electrophotosensitive member having a surface portion on which charges are established in an extremely different state as compared to a surrounding surface portion, the conductive member functions so as to smooth out the differently established charges. For example, in the case of reverse development in which primary charging is performed by means of negative charges, when positive charges are excessively established through transfer, a state shown in FIG. 3A(1) is established. Specifically, positive charges are established on a surface portion of the electrophotosensitive member corresponding to the exterior side of a transfer medium. Negative charges are established on a surface portion of the electrophotosensitive member corresponding to the interior side of the transfer medium. Surface potential V of the electrophotosensitive member includes a potential step Va corresponding to an end portion of the transfer medium. In subsequent primary charging, the electric potential of the surface portion carrying positive charges cannot increase to a predetermined level, causing attraction of unnecessary toner onto the electrophotosensitive member, fogging, or uneven image density with respect to halftone. However, as shown in FIG. 3A(2), as a result of the electrically floating conductive member abutting the electrophotosensitive member, charges are smoothed out in the surface portions carrying positive and negative charges.

When the electrically grounded conductive member is brought into contact with the electrophotosensitive member, charges on the electrophotosensitive member are caused to move toward the ground (equivalent to elimination of charges), thereby smoothing out charges and causing the surface voltage V of the electrophotosensitive member to approach 0 V. As described above, in the case of reverse development in which primary charging is performed by means of negative charges, when positive charges are established on the electrophotosensitive member through transfer (FIG. 3B(1)), charges can be smoothed out (FIG. 3B(2)), thereby relaxing fogging and attraction of unnecessary toner onto the electrophotosensitive member.

Figure 3C:
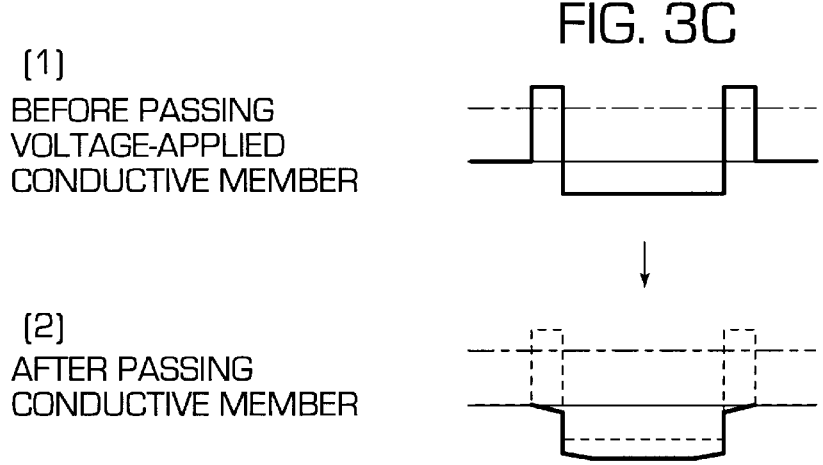

When the conductive member connected to a voltage source (high-voltage transformer) is brought into contact with the electrophotosensitive member (FIG. 3C(1)), charges can be eliminated from the electrophotosensitive member more reliably (FIG. 3C(2)) than in the above-described methods, thereby preventing fogging and attraction of unnecessary toner onto the electrophotosensitive member.

That is, in terms of a capability of smoothing charges on and eliminating charges from the electrophotosensitive member by means of the conductive member, the method in which voltage is applied to the conductive member is most effective; the method in which the conductive member is grounded is next effective; and the method in which the conductive member is floated is least effective. These methods may be selected according to applications.

In the case where voltage is applied to the conductive member, the conductive member can be used as primary charging means. In the case where dc voltage is applied to the conductive member in order to generate a surface voltage $V_0$ on a subject member, such as an electrophotosensitive member, $V_0$ plus charging starting voltage may be applied. In the case where ac voltage is to be superposed on dc voltage for application to the conductive member, the dc voltage may assume $V_0$, and the ac voltage may assume a peak-to-peak value that is at least double the charging starting voltage.

A subject member is not limited to an electrophotosensitive member, but may be any member whose charges are to be smoothed or that is to be charged.

For example, the conductive member may be used for smoothing charges on, eliminating charges from, or establishing charges on a transfer belt or intermediate transfer member, which abuts an electrophotosensitive member via a transfer medium, such as paper. Alternatively, the conductive member may abut an electrophotosensitive member while a transfer medium extends between the conductive member and the electrophotosensitive member, thereby transferring toner from the electrophotosensitive member to the transfer medium.

Figure 4A:
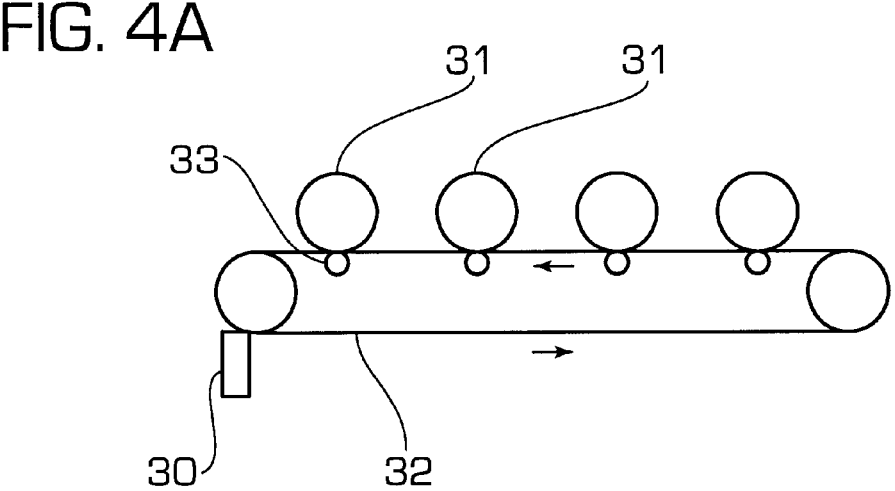
FIG. 4A is a view showing a mode for using the conductive member.
Figure 4B:
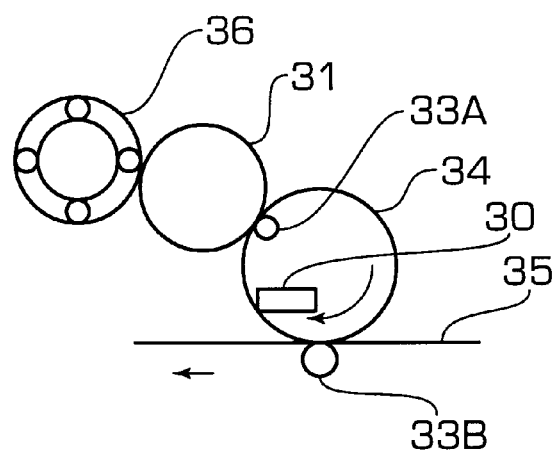
FIG. 4B is a view showing another mode for using the conductive member.
Figure 4C:
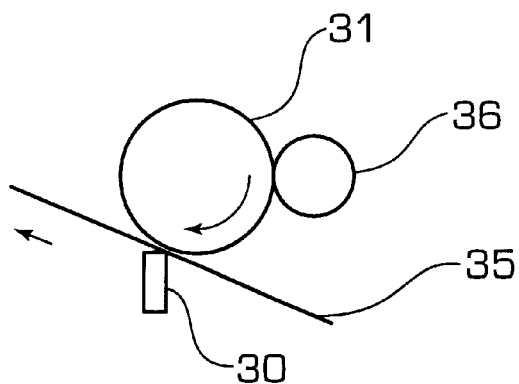
FIG. 4C is a view showing still another mode for using the conductive member.

FIGS. 4A–4C depict modes for using the conductive member. In FIG. 4A, a plurality of electrophotosensitive members 31 are disposed in contact with a transfer belt 32, which is rotatively driven. Transfer rollers 33 are disposed in opposition to the corresponding electrophotosensitive members 31, while the transfer belt 32 is interposed therebetween. A conductive member 30 of the present invention is disposed in contact with the transfer belt 32.

In FIG. 4B, an intermediate transfer member 34 is disposed in contact with an electrophotosensitive member 31 while being interposed between the electrophotosensitive member 31 and a transfer roller 33A. A transfer roller 33B causes a transfer medium 35 to abut the intermediate transfer member 34. An image formed by a developing unit 36 is transferred to the transfer medium 35 via the intermediate transfer member 34. A conductive member 30 of the present invention is disposed in contact with the inner surface of the intermediate transfer member 34.

In FIG. 4C, a transfer medium 35 is in direct contact with an electrophotosensitive member 31 to thereby transfer to a transfer medium 35 an image formed by a developing unit 36. A conductive member 30 of the present invention abuts the transfer medium 35 from opposite the electrophotosensitive member 31.

Figure 5:
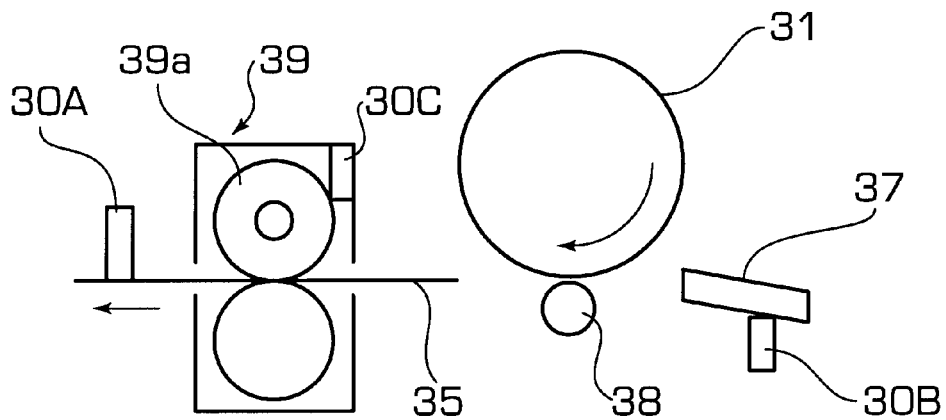
FIG. 5 is a view showing a further mode for using the conductive member.

FIG. 5 depicts a still further mode for using the conductive member. Being fed via transfer medium transport means 37, a transfer medium 35 is transported while passing between an electrophotosensitive member 31 and a transfer medium roller 38. Then, the transfer medium 35 is transported while passing between a pair of fixing rollers 39a of fixing means 39. The conductive member of the present invention may be disposed in contact with the transfer medium 35 (conductive member 30A), the transfer medium transport means 37 (conductive member 30B), or the fixing roller 39a (conductive member 30C). In any of these cases, charges can be smoothed, eliminated, or established.

Figure 6:
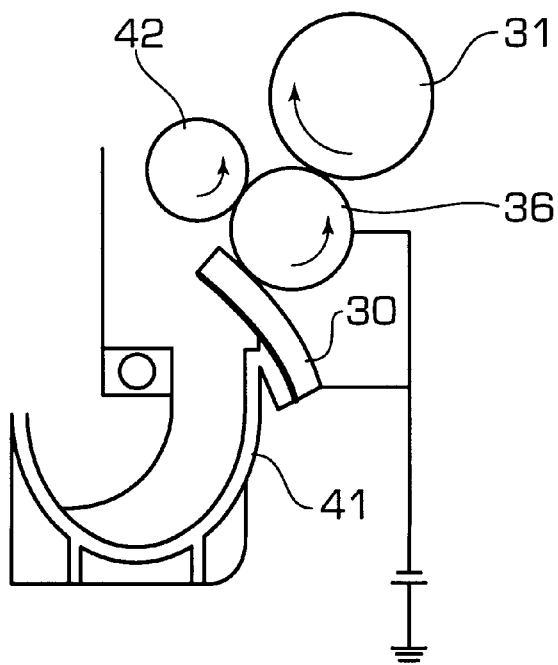
FIG. 6 is a view showing a still further mode for using the conductive member.

FIG. 6 depicts a still further mode for using the conductive member. The conductive member is used as a developing blade in a single-component developing system. A developing unit 36 is disposed in contact with a toner feed roll 42, which is disposed within a toner container 41. An electrophotosensitive member 31 is disposed in contact with the developing unit 36. A conductive member 30 is disposed in contact with an outlet portion of the toner container 41 and is used as a developing blade for controlling the thickness of a toner layer formed on the developing unit 36. Bias identical to developing bias (negative, for example) is applied to the conductive member 30, thereby preventing attraction of toner of reverse polarity to the developing unit 36. Further, a portion of the conducting member 30 that slides on the developing unit 36 contains a conducting filler at sufficiently low density or contains no conducting filler, thereby preventing voltage leakage to any scratch present on the developing unit 36 and exhibiting excellent durability.

When the conductive member of the present invention is to be used as a cleaner, a contact force must be increased in order to clean off remaining toner from an electrophotosensitive member. Thus, the conductive member must possess endurance to wear. According to the present invention, a portion of low conducting-filler density abuts the electrophotosensitive member, thereby utilizing endurance to wear possessed by a polymeric base material, such as polyurethane. A conventional conductive member composed of a blade-shaped base and an insulating layer bonded to the base involves a drawback in that the insulating layer tends to come off due to friction between an electrophotosensitive member and the conductive member. Further, the manufacturing process becomes complicated. The present invention is advantageous in this point, since a single-body structure is employed.

EXAMPLES

The present invention will next be described in detail by way of example, which should not be construed as limiting the invention.

Examples 1–3

Table 2 shows compositions used in examples 1–3.

Polyester polyol as blended in Table 2 was melted through application of heat. Into the melt, carbon black (TOKA BLACK #5500 (trade name, product of Tokai Carbon Co., Ltd.)) and at least either one of lithium perchlorate serving as an ionic conducting filler and DISPARLON DA-703-50 (trade name, product of Kusumoto Kasei Co., Ltd.) were dispersed. 4,4'-Diphenyl methane diisocyanate (MDI) was reacted with the resulting mixture, yielding a prepolymer. 1,4-Butanediol and trimethylolpropane were mixed, in the ratios shown in Table 2, with the prepolymer. The resulting mixture was charged into a preheated centrifugal molding drum and was then cured through application of heat while the drum was being rotated at low speed (centrifugal force 75G). The true density of the carbon black was 1.8, and the specific gravity of the prepolymer, which served as a base material, was 1.16.

The thus-molded sheets were cut into rubber blades of predetermined dimensions. The rubber blades were bonded to the respective metallic holders. After a bonding agent was cured, electric conductivity was imparted to the rubber blades and holders by use of a conductive carbon paste, yielding conductive blades. Notably, when the cut surfaces of the conductive blades were observed, a portion having a conducting-filler density of not higher than 30% was hardly observed.

In Table 2, PCL 220N is a trade name of ester polyol (Mn=2000) produced by Daicel Chemical Industries, Ltd.; P-2010 is a trade name of ester polyol (Mn=2000) produced by kuraray Co., Ltd.; and PPG 2000 is a trade name of ester polyol (Mn=2000) produced by Sanyo Chemical Industries, Ltd.

Example 4

A conductive blade was fabricated in a manner similar to that of example 1 except that the centrifugal molding drum was rotated at high speed (centrifugal force 360G). When the cut surface of the conductive blade was observed, a portion having a conducting-filler density of not higher than 30% was found to range 50 μm inwardly from an end of the conductive blade.

Example 5

A conductive blade was fabricated in a manner similar to that of example 4 except that carbon black was singly dispersed into polyol.

TABLE 2

|  | Example 1 | Example 2 | Example 3 | Example 5 |
| --- | --- | --- | --- | --- |
| Ester polyol PCL 220N | 67 | 72 | 67 | 72 |
| Ester polyol P-2010 | 26.6 | 26.6 | 26.6 | 26.6 |
| Ester polyol PPG 2000 | 4.5 | — | 4.5 | — |
| Carbon black | 1.4 | 1.4 | 1.4 | 1.4 |
| Ionic conducting filler | 0.5 | — | 0.5 | — |
| Carbon black dispersant | — | 0.14 | 0.14 | — |
| MDI | 43 | 43 | 43 | 43 |
| 1,4-Butanediol | 6.83 | 6.83 | 6.83 | 6.83 |
| Trimethylolpropane | 3.37 | 3.37 | 3.37 | 3.37 |

Test Example 1

The rubber members molded in examples 1–5 were measured for electric resistance at a temperature of 23° C. and a humidity of 55% after a voltage of 100 V was applied thereto for 30 seconds. The results are shown below in Table 3. Surface resistivity was measured on the mirror-surface side (the open surface side).

In the case of the examples in which carbon black was used in combination with an ionic conducting filler and/or a carbon black dispersant, volume resistivity and surface resistivity were both two or three orders of magnitude smaller, and sufficient electric conductivity was obtained even at the mirror surface (the open surface). In the case of comparative example in which carbon black was used singly, obtained electric conductivity was insufficient.

In the case of example 4, in which the centrifugal molding drum was rotated at high speed, volume resistivity and surface resistivity were slightly higher than those of example 1, but sufficient electric conductivity was obtained.

TABLE 3

| | Volume resistivity $\Omega \cdot cm$ | Surface resistivity $\Omega$ |
|---|---|---|
| Example 1 | $2.2 \times 10^6$ | $9.4 \times 10^6$ |
| Example 2 | $3.1 \times 10^6$ | $2.3 \times 10^7$ |
| Example 3 | $2.5 \times 10^6$ | $1.8 \times 10^7$ |
| Example 4 | $1.8 \times 10^7$ | $2.4 \times 10^8$ |
| Example 5 | $2.0 \times 10^7$ | $5.1 \times 10^8$ |

Test Example 2

The conductive blades of examples 1 and 4 were subjected to a running test while voltage was applied thereto. The conductive blades exhibited good cleaning characteristics and electric conductivity. However, in the case of the conductive blade of example 1, carbon black came off a tip, causing deterioration in cleaning characteristics and formation of a black line.

The tips (mirror-surface (open-surface) side) of the conductive blades were observed through a microscope. In the case of the conductive blade of example 4, no carbon black existed in the vicinity of the surface, indicating that carbon black will not come off during use over a long period of time.

What is claimed is:

1. A conductive member which is used in contact with a subject member, said conductive member having a single-body structure and formed of a polymeric base material that contains a conducting filler, the density of the conducting filler as measured at or in the vicinity of the portion of said conductive member that abuts the subject member being lower than that in the remaining portion of said conductive member, or substantially zero, wherein the portion in which the density of the conducting filler is lower than that in the remaining portion or substantially zero ranges 20–120 µm inwardly from an end of said conductive member at which said conductive member abuts the subject member.

2. A conductive member which is used in contact with a subject member, said conductive member having a single-body structure and formed of a polymeric base material that contains a conducting filler, wherein the true density of particles of the conducting filler or the specific gravity of particles including the conducting filler is greater than the specific gravity of the polymeric base material.

3. A conductive member according to claim 2, wherein the polymeric base material, which contains the conducting filler, is manufactured through centrifugal molding.

4. A conductive member which is used in contact with a subject member, said conductive member having a single-body structure and formed of a polymeric base material that contains a conducting filler, wherein said conductive member contains as the conducting filler carbon black in an amount of 0.1–5.0% by weight in relation to the amount of the polymeric base material.

5. A conductive member according to claim 4, wherein said conductive member contains as the conducting filler one or more fillers selected from the group consisting of ionic conducting fillers and carbon black dispersants in an amount of 0.01–5.0% by weight in relation to the amount of the polymeric base material.

6. A conductive member which is used in contact with a subject member, said conductive member having a single-body structure and formed of a polymeric base material that contains a conducting filler, wherein the electric resistance of the conducting member is $1 \times 10^5$ to $1 \times 10^9$ $\Omega \cdot cm$.

7. A conductive member according to claim 1, 2, 4 or 6, wherein said conductive member contains as the conducting filler at least carbon black.

8. A conductive member according to claim 1, 2, 4 or 6, wherein said conductive member contains as the conducting filler carbon black as the main filler, and one or more fillers selected from the group consisting of ionic conducting fillers and carbon black dispersants.

9. A conductive member according to claim 1, 2, 4, or 6, wherein the polymeric base material is an elastomer.

10. A conductive member according to claim 1, 2, 4, or 6, wherein the polymeric base material is polyurethane or silicone rubber.

11. A conductive member according to claim 1, 2, 4, or 6, wherein said conductive member assumes a blade shape.

* * * * *